United States Patent
Assenmacher et al.

(10) Patent No.: US 8,220,480 B2
(45) Date of Patent: Jul. 17, 2012

(54) SANITARY FITTING

(75) Inventors: Bernd Assenmacher, Stuttgart (DE); Christof Frey, Salach (DE)

(73) Assignee: Hansa Metallwerke AG (DE)

( * ) Notice: Subject to any disclaimer, the term of this patent is extended or adjusted under 35 U.S.C. 154(b) by 1011 days.

(21) Appl. No.: 11/915,544

(22) PCT Filed: May 22, 2006

(86) PCT No.: PCT/EP2006/004814
§ 371 (c)(1), (2), (4) Date: May 13, 2008

(87) PCT Pub. No.: WO2006/128605
PCT Pub. Date: Dec. 7, 2006

(65) Prior Publication Data
US 2008/0223462 A1 Sep. 18, 2008

(30) Foreign Application Priority Data
May 28, 2005 (DE) .......................... 10 2005 024 555

(51) Int. Cl.
*G05D 11/00* (2006.01)
(52) U.S. Cl. ............... 137/119.05; 137/119.08; 137/597
(58) Field of Classification Search .................. 137/597, 137/119.05, 119.08
See application file for complete search history.

(56) References Cited

U.S. PATENT DOCUMENTS

| | | | |
|---|---|---|---|
| 2,206,609 A | 7/1940 | Klein | |
| 3,370,609 A | 2/1968 | Botnick | |
| 3,545,473 A * | 12/1970 | Moia | ........................ 137/119.05 |
| 4,606,370 A | 8/1986 | Geipel et al. | |
| 5,383,604 A | 1/1995 | Boesch | |
| 5,730,184 A | 3/1998 | Moench | |
| 5,813,436 A | 9/1998 | Chen | |
| 7,000,854 B2 * | 2/2006 | Malek et al. | ................... 239/445 |
| 7,373,952 B2 * | 5/2008 | Gaenzle et al. | ............ 137/625.4 |

FOREIGN PATENT DOCUMENTS

DE 2019877 A1 11/1971
(Continued)

OTHER PUBLICATIONS

Machine Translation of DE 19901553 A1.*
(Continued)

*Primary Examiner* — Craig M Schneider
*Assistant Examiner* — Jessica Cahill
(74) *Attorney, Agent, or Firm* — Factor Intellectual Property Law Group, Ltd.

(57) ABSTRACT

A sanitary fitting has a housing which has a hot-water supply, a cold-water supply and two mixed-water outlets, having a cartridge arranged in the housing and a mixing valve for cold and hot water, arranged between the two mixed-water outlets is a changeover valve which comprises a double valve cone which can be moved from a first position, which releases the first mixed-water outlet, into a second position, which releases the second mixed-water outlet and in which it is held under the pressure of mixed water flowing through the second mixed-water outlet until it returns automatically into the first position once the inflow of water has been switched off. The sanitary fitting has an operating element which can be actuated and is coupled to the actuating member such that actuating member is moved into the second position by virtue of the operating element being pressed.

7 Claims, 5 Drawing Sheets

FOREIGN PATENT DOCUMENTS

| | | |
|---|---|---|
| DE | 2125762 A1 | 12/1972 |
| DE | 7716688 U1 | 9/1977 |
| DE | 3124214 A1 | 1/1986 |
| DE | 9314443 U1 | 12/1993 |
| DE | 4323496 A1 | 1/1995 |
| DE | 29713238 U1 | 9/1997 |
| DE | 19901553 A1 | 7/2000 |
| DE | 102004045490 * | 1/2006 |
| WO | WO2004/059197 * | 7/2004 |

OTHER PUBLICATIONS

Machine Translation of DE 102004045490.*

* cited by examiner

SANITARY FITTING

RELATED APPLICATIONS

This application claims the filing benefit of International Patent Application No. PCT/EP2006/004814, filed May 22, 2006, which claims the filing benefit of German Patent Application No. 10 2005 024 555.2 filed May 28, 2005, the contents of all of which are incorporated herein by reference.

TECHNICAL FIELD

The invention relates to a sanitary fitting having a housing, which has a hot-water intake, a cold-water intake and two mixed-water outlets, having a cartridge, which is disposed in the housing and has a mixing valve for cold- and hot water, wherein disposed between the two mixed-water outlets is a changeover valve, which comprises a double cone valve, which as a result of pulling on an actuating member is movable counter to the action of a restoring spring from a first position, in which it releases the first mixed-water outlet, into a second position, in which it releases the second mixed-water outlet and in which it is held under the pressure of mixed water flowing through the second mixed-water outlet until, after the inflow of water has stopped, it returns automatically into the first position.

BACKGROUND OF THE INVENTION

Such a sanitary fitting is described for example in DE 2019877. The sanitary fitting is used as a shower fitting, in which the mixed-water outlets are connected to a free outlet for the bath and/or to a supply for a shower. The changeover from bath to shower is effected by pulling on an actuating member. After the inflow of water has stopped, the shower fitting under the action of the restoring spring switches back over to the free outlet of the bath in order, when the tap is next opened, to prevent a jet of water from unintentionally spraying out of the shower.

However, particularly in the case of sanitary fittings of superior quality, this kind of operation by pulling on an actuating member is found uncomfortable by many users.

The present invention is directed to resolving these and other matters.

SUMMARY OF THE INVENTION

An object of the present invention is to indicate a sanitary fitting, in which a changeover from bath to shower may be carried out in a more advantageous manner. This object may be achieved by a sanitary fitting having the features of a sanitary fitting having a housing, which has a hot-water intake, a cold-water intake and two mixed-water outlets having a cartridge, which is disposed in the housing and has a mixing valve for cold and hot water, wherein disposed between the two mixed-water outlets is a changeover valve, which comprises a double cone valve, which as a result of pulling on an actuating member is movable counter to the action of a restoring spring from a first position, in which it releases the first mixed-water outlet, into a second position, in which it releases the second mixed-water outlet and in which it is held under the pressure of mixed water flowing through the second mixed-water outlet until, after the inflow of water has stopped, it returns automatically into the first position, wherein an operating element, which is actuable by pressing and is coupled by a deflecting mechanism in such a way to the actuating member that as a result of pressing on the operating element the actuating member is moved into the second position counter to the action of the restoring spring.

According to the invention, the sanitary fitting has an operating element, which is actuable by pressing and is coupled by a deflecting mechanism in such a way to the actuating member that as a result of pressing on the operating element the actuating member is moved into the second position counter to the action of the restoring spring.

An operating element that is actuable by pushing instead of pulling conveys a feeling of higher quality and comfort to the user. Furthermore, by virtue of the deflecting mechanism the original geometry of the sanitary fitting is retained so there is no need for a fundamental redesign of the changeover valve.

In a first form of construction, the deflecting mechanism comprises a rocker, which acts on the actuating member and to the other end of which a push rod is hinge-connected, which leads to the operating element.

In this case, the push rod preferably has on its end facing the operating element a spherical head, which lies in a corresponding ball cup of the operating element. This makes it possible to compensate an angular offset between operating element and push rod and hence achieve stress-free, easy-running actuation.

In a second form of construction, the deflecting mechanism has a substantially U-shaped deflecting part, which is situated movably around the housing of the sanitary fitting, wherein the deflecting part is attached by one end to the actuating member and to the other end there is fastened in an articulated manner a rocker arm, which is mounted pivotably about a housing-fixed axle and is operable by means of an operating element in the form of a pushbutton.

This embodiment offers an advantageous geometry in terms of the actuating distances and the expenditure of force required for operation and results in an operationally particularly reliable and durable mechanism.

The sanitary fitting according to the invention may advantageously take the form of a wall fitting for flush mounting. It then has a supporting plate for a screwless bezel, through which the operating element projects.

Preferably, the operating element is spring-loaded so that it has no play and after actuation returns to its normal position.

It is preferred when the sanitary fitting is used as a bath/shower fitting. In this case, the first mixed-water outlet is intended for connection to a free outlet for a bath and the second mixed-water outlet is intended for connection to a supply for a shower.

It is to be understood that the aspects and objects of the present invention described above may be combinable and that other advantages and aspects of the present invention will become apparent upon reading the following description of the drawings and detailed description of the invention.

DETAILED DESCRIPTION OF THE PRESENT INVENTION

Figure 1:
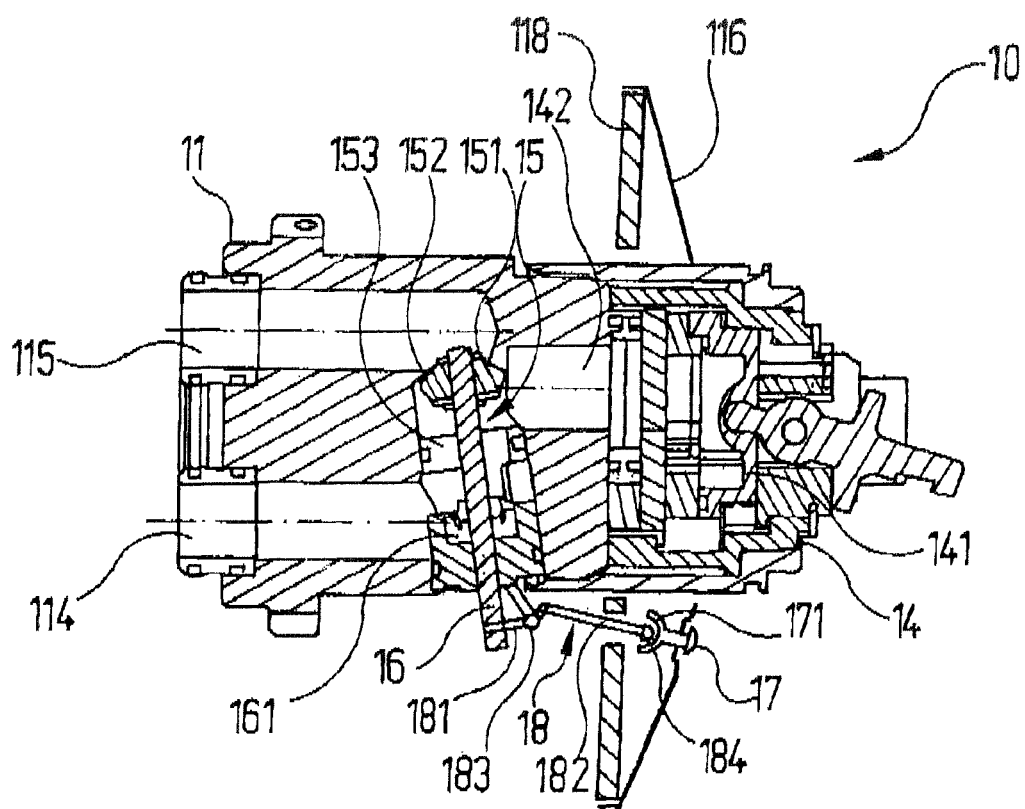
FIG. 1 a section through a first embodiment of a bath/shower fitting according to the invention, FIG. 2 a sectional drawing of a second embodiment of a bath/shower fitting in "bath" position, FIG. 3 a sectional drawing of the bath/shower fitting of FIG. 2 in "shower" position, FIG. 4 an isometric projection of a deflecting mechanism in the second embodiment and FIG. 5 a further isometric projection of the deflecting mechanism of FIG. 4 from a different perspective.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

As a first embodiment, a bath/shower fitting 10 with one-hand mixer in a flush mounting design is represented in FIG. 1. The bath/shower fitting 10 has a housing 11, in which a cartridge 14 with a mixing valve 141 is situated, the exact design of which does not particularly matter here. The housing 11 has two mixed-water outlets 114, 115, which communicate via a changeover valve 15 with the mixing valve 141. Hot- and cold-water supplies are not visible in FIG. 1. During assembly, a supporting plate 118 of the bath/shower fitting 10 is screw-fastened against the wall and a screwless bezel 116 is placed as a cover onto the supporting plate 118.

A bath outlet is connected to the mixed-water outlet 114 and the supply of a shower is connected to the mixed-water outlet 115. By means of the changeover valve 15 the water flow is changed over from the bath outlet to the shower. For this purpose, the changeover valve 15 has a double valve cone 151, which interacts with two diametrically opposite, housing-fixed valve seats 152 and 153. When the double valve cone 151 rests against the valve seat 152, mixed water then flows out of the mixing valve 141 through the mixed-water channel 142 to the mixed-water outlet 114 (bath). Conversely, when the double valve cone 151 rests against the valve seat 153, the path to the mixed-water outlet 114 is blocked and mixed water then flows out of the mixing valve 141 through the mixed-water channel 142 to the mixed-water outlet 115 (shower).

The double valve cone 151 is actuated by means of an actuating member 16. A restoring spring 161 holds the double valve cone 151 normally in abutment with the valve seat 152. However, when as a result of pulling on the actuating member 16 the double valve cone 151 is displaced against the valve seat 153, mixed water flows behind the double valve cone 151 and the water pressure holds the double valve cone 151 against the valve seat 153 counter to the action of the restoring spring 161. It is only when the inflow of water stops that the double cone valve 151 as a result of the action of the restoring spring 161 returns automatically into the normal position against the valve seat 152.

A pushbutton 17 is used to actuate the actuating member 16 via a deflecting mechanism 18. The deflecting mechanism 18 comprises a rocker 181, which acts with one limb on the actuating member 16. A push rod 182 is hinge-connected to the other limb of the rocker 181 and leads to the pushbutton 17. The rocker 181 is mounted pivotably about a housing-fixed axle 183. The push rod 182 on its end facing the pushbutton 17 has a spherical head 184, which lies in a corresponding ball cup 171 of the pushbutton 17. In this way, any angular offset between push rod 182 and pushbutton 17 is compensated.

The pushbutton 17 is screw-fastened by a corresponding counterpart (not shown), in which the pushbutton 17 and an associated restoring spring (likewise not shown) are mounted, from the rear to the bezel 116.

When a user presses on the pushbutton 17 of the bath/shower fitting 10, the pressing motion is transmitted via the push rod 182 to the rocker 181 and hence pivots the rocker 181 about the housing-fixed axle 183. In this case, by means of the opposite limb of the rocker 181 the actuating member 16 is drawn out of the housing 11 and moves the double valve cone 151 against the valve seat 153, with the result that mixed water flows out of the mixed-water outlet 115 to the shower. A switching back to the bath outlet is effected by stopping the inflow of water.

Figure 2:
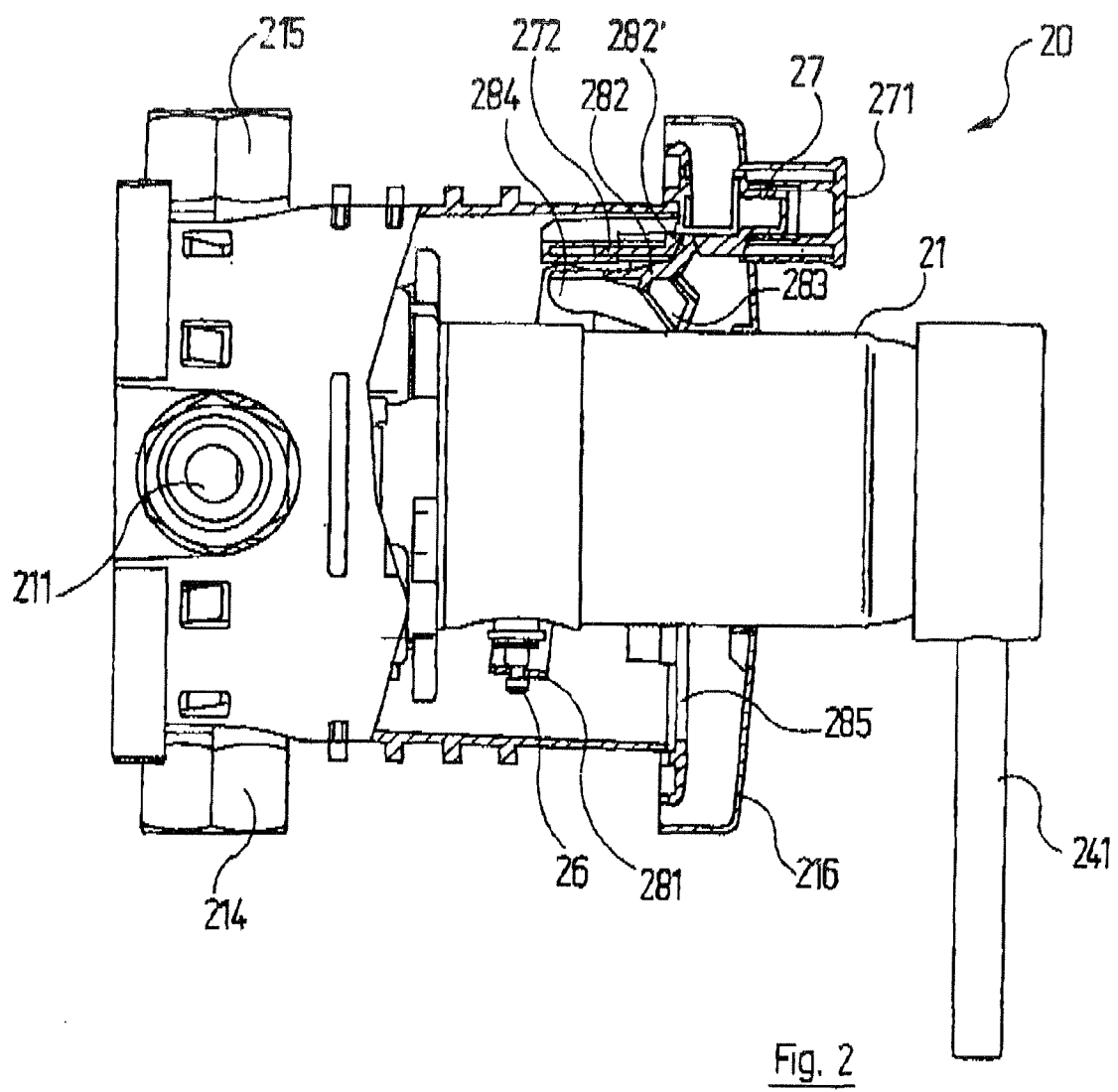

FIG. 2 shows a sectional drawing of a second embodiment of a flush-mounted bath/shower fitting 20. The bath/shower fitting 20 has a housing 21 with two mixed-water outlets 214, 215, a hot-water intake 211 and a cold-water intake. The cold-water intake is situated at the far side of the bath/shower fitting and is therefore not visible in FIG. 2. In the housing 21 a cartridge with a mixing valve is disposed, which is operated by means of an operating lever 241. The mixed-water outlets 214, 215 are connected by a changeover valve to the mixing valve. As FIG. 2 does not show the housing 21 in a cut-open manner, it is impossible to see the mixing valve and the changeover valve. The function of the two valves is as described for the embodiment of FIG. 1.

A bath outlet is connected to the mixed-water outlet 214 and the supply of a shower is connected to the mixed-water outlet 215. The changeover from "bath" valve position to "shower" valve position is effected in the changeover valve by drawing an actuating member 26 out of the housing 21 of the bath/shower fitting 20. The actuating member 26 is actuated by an operating element in the form of pushbutton 27 via a deflecting mechanism 28, which comprises a U-shaped deflecting part 281 and a rocker arm 282 (cf. FIGS. 4 and 5). The U-shaped deflecting part 281 is situated movably around the housing 21 of the bath/shower fitting 20 and acts at the, in FIG. 2, bottom side on the actuating member 26. At the opposite side, the ends of the limbs of the U-shaped deflecting part 281 are hinge-connected by hinge pins 284 to the rocker arm 282. The rocker arm 282 is mounted pivotably about a housing-fixed axle 283. The housing-fixed axle 283 is connected to a supporting plate 285. The pushbutton 27 projects from behind through a bore in the supporting plate 285 and in a mounted bezel 216. A cap 271 is placed from the outside onto the pushbutton 27.

The pushbutton on its rear end has a press pin 272, which is guided in a corresponding guide in the housing 21 of the bath/shower fitting 20. The rocker arm 282 has a dog 282', which engages into a recess in the press pin 272.

Figure 3:
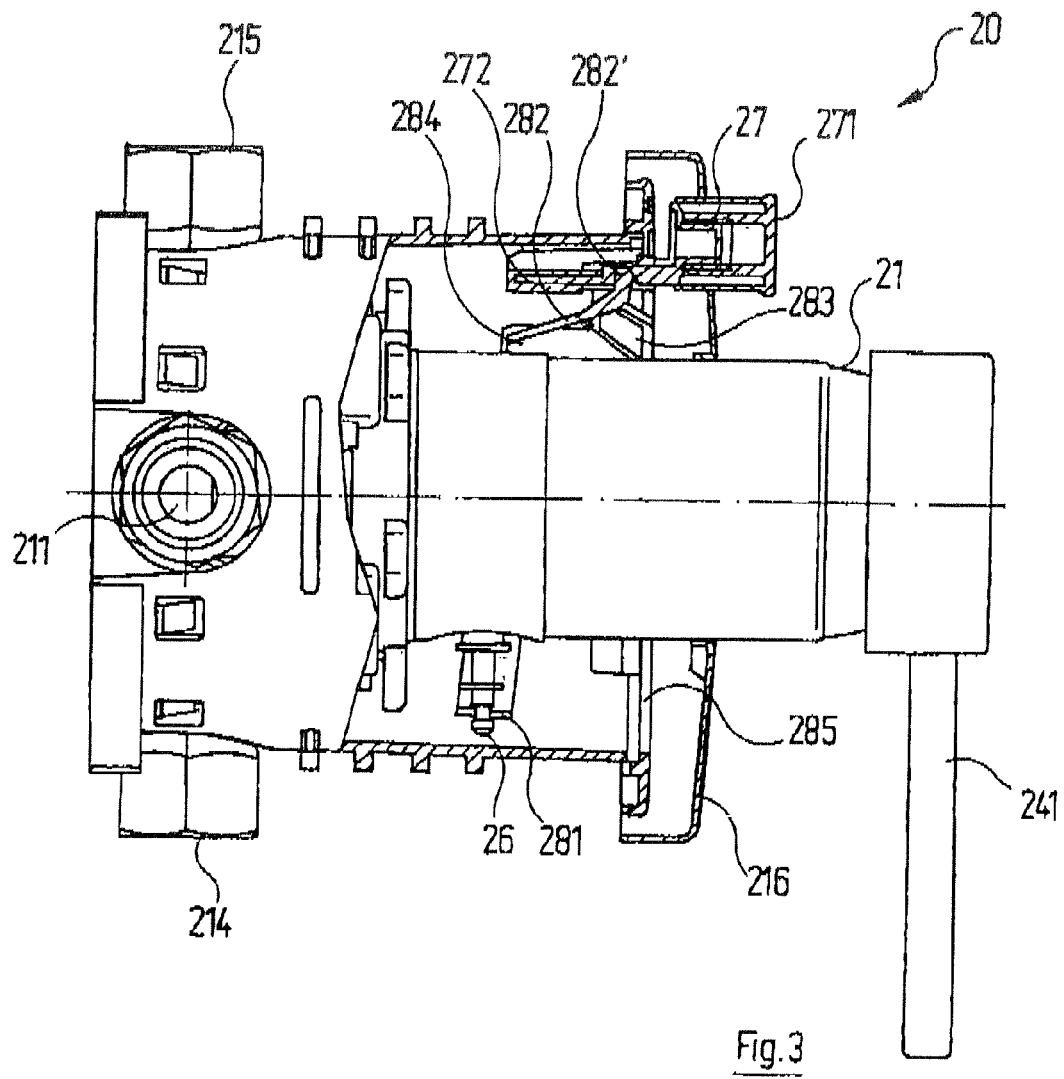

In FIG. 2 the bath/shower fitting 20 is shown in the "bath" valve position, in which water flows out of the mixed-water outlet 214. By pressing lightly on the pushbutton 27 and/or the sleeve 271 placed thereon, the dog 282' is driven by the press pin 272 and the rocker arm 282 is therefore pivoted about the housing-fixed axle 283. The rocker arm 282 therefore moves the U-shaped deflecting part 281 in the figure in a downward direction. The actuating member 26 is therefore drawn out of the bath/shower fitting 20 and switches the changeover valve into the "shower" position, in which water flows out of the mixed-water outlet 215. This position is shown in FIG. 3.

Figure 4:
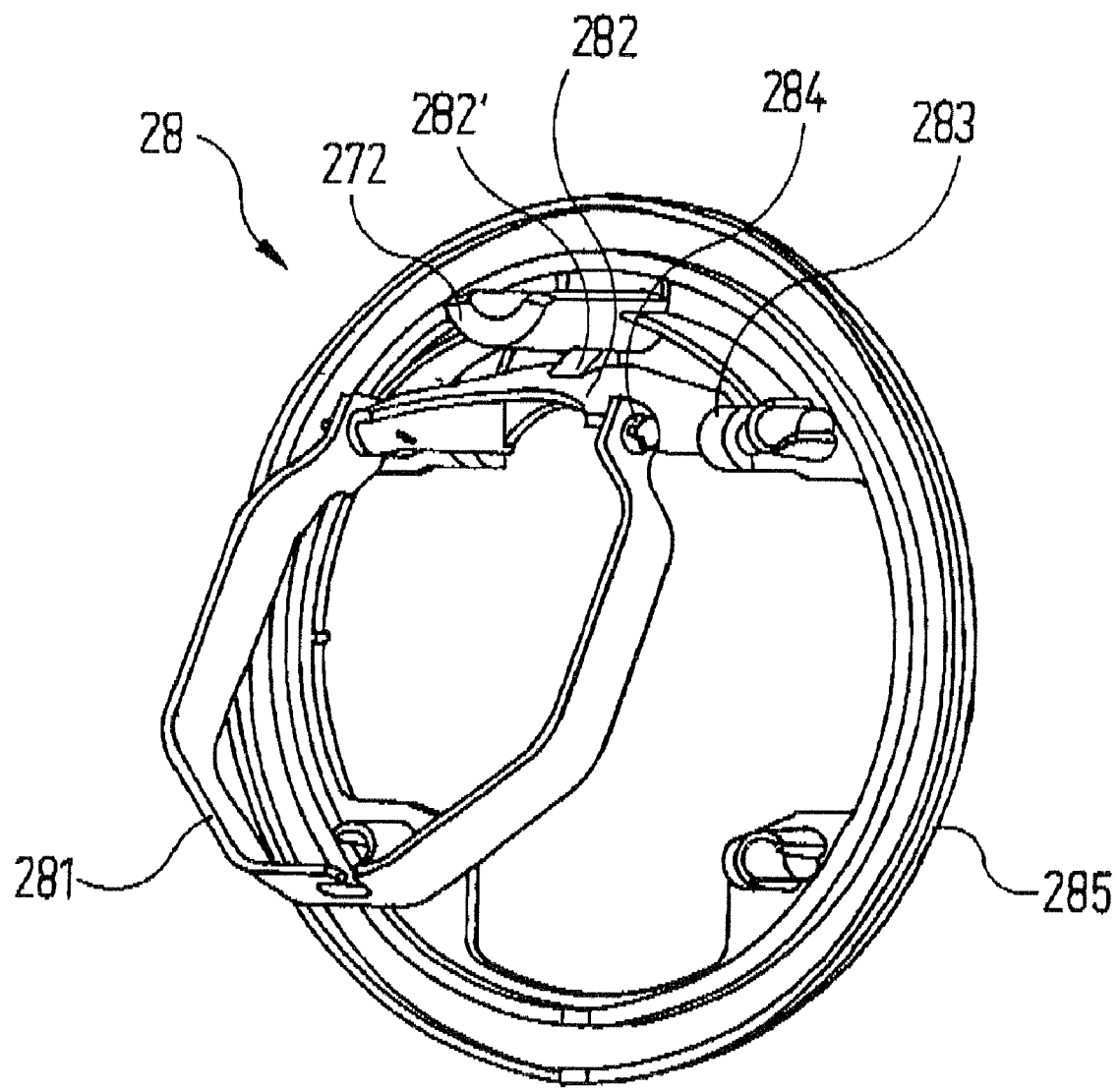
Figure 5:
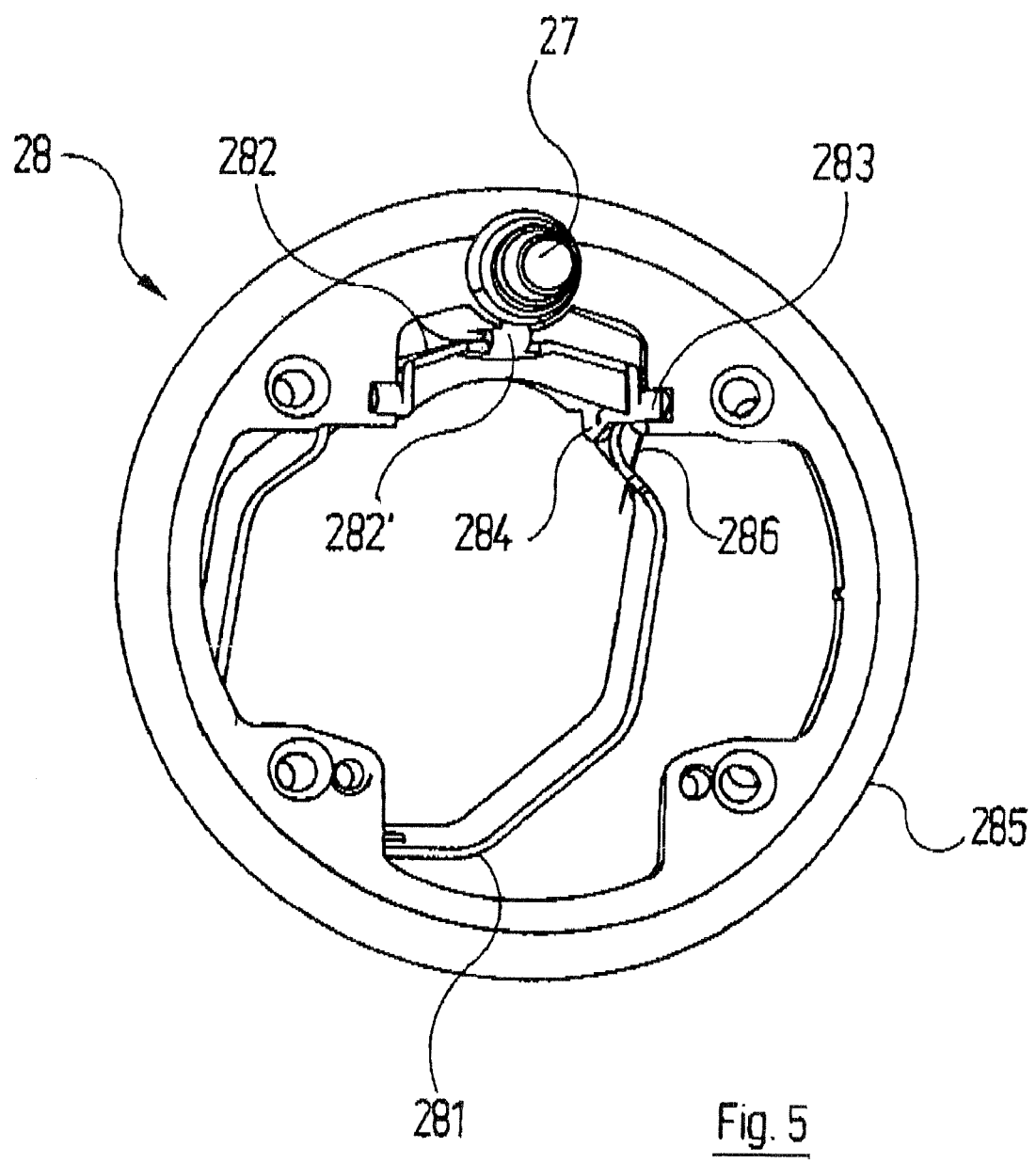

FIG. 4 shows the deflecting mechanism 28 of the bath/shower fitting 20. The rocker arm 282 is connected to the supporting plate 285 by an axle 283. The U-shaped deflecting part 281 is connected by the axle 284 to the rocker arm 282. The dog 282' on the rocker arm 282 engages behind the supporting plate 285 into the recess in the press pin 272, which is integrally connected to the pushbutton 27. FIG. 5 shows the deflecting mechanism 28 of the bath/shower fitting 20 from the front. The press pin 272 acts on the dog 282' of the rocker arm 282 and, upon actuation of the pushbutton 27, pivots the rocker arm 282 about the axle 283. A spiral torsion spring, which is stretched around the axle 283 and the end 286 of which in FIG. 5 presses against the U-shaped deflecting part 281, ensures that the rocker arm 282 rests permanently against the pushbutton 27, so that the pushbutton 27 has no play.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A sanitary fitting comprising:
   a housing, which has a hot-water intake, a cold-water intake and two mixed-water outlets,
   a cartridge, which is disposed in the housing and has a mixing valve for cold and hot water,
   wherein disposed between the two mixed-water outlets is a changeover valve, which comprises a double cone valve, which as a result of pulling on an actuating member, the changeover valve is movable counter to the action of a restoring spring from a first position, in which it releases the first mixed-water outlet, into a second position, in which it releases the second mixed-water outlet, and in which it is held under the pressure of mixed water flowing through the second mixed-water outlet until, after the inflow of water has stopped, it returns automatically into the first position,
   wherein an operating element, which is actuable by pressing and is coupled by a deflecting mechanism in such a way to the actuating member that as a result of pressing on the operating element the actuating member is moved into the second position counter to the action of the restoring spring, and
   wherein the deflecting mechanism comprises a substantially U-shaped deflecting part that is situated movably around the housing of the sanitary fitting, and wherein the deflecting part at one side is attached to the actuating member and on an opposite side of the one side is fastened in an articulated manner to a rocker arm, which is mounted pivotably about a housing-fixed axle and actuable by means of the operating element in the form of a pushbutton.

2. The sanitary fitting of claim 1, wherein it takes the form of a shower fitting and the first mixed-water outlet is intended for connection to a bath outlet and the second mixed-water outlet is intended for connection to a supply for a shower.

3. The sanitary fitting of claim 1, wherein the operating element is spring-loaded.

4. The sanitary fitting of claim 3, wherein it takes the form of a shower fitting and the first mixed-water outlet is intended for connection to a bath outlet and the second mixed-water outlet is intended for connection to a supply for a shower.

5. The sanitary fitting of claim 1, wherein it takes the form of a wall fitting for flush mounting and has a supporting plate for a screwless bezel, through which the operating element projects.

6. The sanitary fitting of claim 5, wherein the operating element is spring-loaded.

7. The sanitary fitting of claim 5, wherein it takes the form of a shower fitting and the first mixed-water outlet is intended for connection to a bath outlet and the second mixed-water outlet is intended for connection to a supply for a shower.

* * * * *